United States Patent
Etienne et al.

(10) Patent No.: US 10,295,728 B2
(45) Date of Patent: May 21, 2019

(54) LIGHT DIFFUSING COMPONENT AND A METHOD OF MANUFACTURING A LIGHT DIFFUSING COMPONENT

(71) Applicant: CORNING INCORPORATED, Corning, NY (US)

(72) Inventors: Michael Etienne, Corning, NY (US); Matthew Wade Fenton, Elmira, NY (US); Timothy Edward Myers, Painted Post, NY (US); Kathleen Ann Wexell, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/521,145

(22) PCT Filed: Oct. 21, 2015

(86) PCT No.: PCT/US2015/056560
§ 371 (c)(1),
(2) Date: Apr. 21, 2017

(87) PCT Pub. No.: WO2016/064947
PCT Pub. Date: Apr. 28, 2016

(65) Prior Publication Data
US 2017/0336556 A1    Nov. 23, 2017

Related U.S. Application Data

(60) Provisional application No. 62/067,657, filed on Oct. 23, 2014.

(51) Int. Cl.
*F21V 8/00* (2006.01)
*G02B 5/02* (2006.01)
*C03C 15/00* (2006.01)

(52) U.S. Cl.
CPC ............ *G02B 6/0065* (2013.01); *C03C 15/00* (2013.01); *G02B 5/0263* (2013.01);
(Continued)

(58) Field of Classification Search
CPC .......... G02B 6/004–0043; G02B 6/065; G02B 6/0058; G02B 5/0205–0231; G02B 5/0263
See application file for complete search history.

(56) References Cited

U.S. PATENT DOCUMENTS

| | | | |
|---|---|---|---|
| 5,039,627 A | | 8/1991 | Menigaux et al. |
| 5,833,517 A | * | 11/1998 | Konda ...................... B24C 1/04 451/29 |

(Continued)

FOREIGN PATENT DOCUMENTS

| | | |
|---|---|---|
| CN | 1397827 A | 2/2003 |
| CN | 2773839 Y | 4/2006 |

(Continued)

*Primary Examiner* — Mariceli Santiago
(74) *Attorney, Agent, or Firm* — Ryan T. Hardee

(57) ABSTRACT

A light diffusing component is disclosed. The light diffusing component comprises a substrate, such as glass, having a frontside, a backside spaced apart from the frontside, and an edge configured to receive a light source. The glass sheet includes at least one scattering layer having a plurality of light scattering centers etched into at least a portion of the frontside of the glass sheet. The scattering centers have an increased density as the distance from the edge increases and the scattering centers are randomly distributed in size and smaller than about 200 µm. Also disclosed is a method of manufacturing a light diffusing component comprising masking a substrate, such as a glass sheet, and etching the substrate such that the density of the resulting scattering centers increased as the distance from the light source increases.

18 Claims, 3 Drawing Sheets

(52) U.S. Cl.
CPC ......... *G02B 5/0268* (2013.01); *G02B 6/0043* (2013.01); *G02B 6/0061* (2013.01)

(56) References Cited

U.S. PATENT DOCUMENTS

| | | | |
|---|---|---|---|
| 5,917,664 A | 6/1999 | O'Neill et al. | |
| 5,919,551 A | 7/1999 | Cobb, Jr. et al. | |
| 6,052,164 A | 4/2000 | Cobb, Jr. et al. | |
| 6,464,905 B1 * | 10/2002 | Lu | B44C 1/221 216/24 |
| 6,663,262 B2 | 12/2003 | Boyd et al. | |
| 6,719,930 B2 * | 4/2004 | Chen | G02B 6/0053 205/70 |
| 6,845,212 B2 | 1/2005 | Gardiner et al. | |
| 7,085,444 B2 | 8/2006 | Bermel et al. | |
| 7,144,146 B2 * | 12/2006 | Takeuchi | H01L 51/5262 362/617 |
| 7,236,217 B2 | 6/2007 | Kotchick et al. | |
| 7,278,771 B2 | 10/2007 | Campbell | |
| 7,322,731 B2 | 1/2008 | Epstein et al. | |
| 7,384,173 B2 | 6/2008 | Whitney | |
| 7,413,336 B2 | 8/2008 | Freking et al. | |
| 7,528,893 B2 | 5/2009 | Schultz et al. | |
| 7,677,733 B2 | 3/2010 | Brott | |
| 7,706,050 B2 | 4/2010 | Sampsell | |
| 7,750,983 B2 | 7/2010 | Kristofferson | |
| 7,766,528 B2 | 8/2010 | Epstein et al. | |
| 7,766,531 B2 | 8/2010 | Anderson et al. | |
| 7,777,832 B2 | 8/2010 | Richard et al. | |
| 7,847,869 B2 | 12/2010 | Nelson et al. | |
| 7,911,547 B2 | 3/2011 | Brott et al. | |
| 7,989,148 B2 | 8/2011 | Nakashiba et al. | |
| 8,004,622 B2 | 8/2011 | Schultz et al. | |
| 8,035,771 B2 | 10/2011 | Brott et al. | |
| 8,068,187 B2 | 11/2011 | Huizinga et al. | |
| 8,098,347 B2 | 1/2012 | Brott et al. | |
| 8,179,362 B2 | 5/2012 | Bringham et al. | |
| 8,228,463 B2 | 7/2012 | Biernath et al. | |
| 8,289,639 B2 | 10/2012 | Whitney | |
| 8,339,444 B2 | 12/2012 | Schultz et al. | |
| 8,343,633 B2 | 1/2013 | Mazurek et al. | |
| 8,502,249 B2 | 8/2013 | Lee et al. | |
| 8,520,061 B2 | 8/2013 | Vos et al. | |
| 8,657,472 B2 | 2/2014 | Aronson et al. | |
| 8,659,641 B2 | 2/2014 | Brigham et al. | |
| 9,322,977 B2 | 4/2016 | Kuo et al. | |
| 2004/0114347 A1 | 6/2004 | Leu et al. | |
| 2004/0141108 A1 | 7/2004 | Tanaka et al. | |
| 2004/0223100 A1 | 11/2004 | Kotchick et al. | |
| 2005/0237749 A1 | 10/2005 | Epstein et al. | |
| 2006/0103777 A1 | 5/2006 | Ko et al. | |
| 2007/0091230 A1 | 4/2007 | Ouderkirk et al. | |
| 2007/0203267 A1 | 8/2007 | Richard et al. | |
| 2007/0236413 A1 | 10/2007 | Gehlsen et al. | |
| 2007/0236938 A1 | 10/2007 | Ouderkirk et al. | |
| 2007/0236939 A1 | 10/2007 | Ouderkirk et al. | |
| 2007/0237938 A1 | 10/2007 | Ouderkirk et al. | |
| 2008/0086289 A1 | 4/2008 | Brott | |
| 2008/0090025 A1 | 4/2008 | Freking et al. | |
| 2008/0117362 A1 | 5/2008 | Wolk et al. | |
| 2009/0026471 A1 * | 1/2009 | Wu | G02B 5/0221 257/98 |
| 2009/0067048 A1 | 3/2009 | Battiato et al. | |
| 2010/0208497 A1 | 8/2010 | Song et al. | |
| 2010/0283112 A1 | 11/2010 | Tay | |
| 2011/0267697 A1 | 11/2011 | Kohli et al. | |
| 2011/0273636 A1 | 11/2011 | Schultz et al. | |
| 2012/0027998 A1 * | 2/2012 | Ibn-Elhaj | G02B 5/1857 428/161 |
| 2012/0038982 A1 | 2/2012 | Huizinga et al. | |
| 2012/0039082 A1 | 2/2012 | Rodriguez Barros | |
| 2012/0147593 A1 | 6/2012 | Yapel et al. | |
| 2012/0154450 A1 | 6/2012 | Aho et al. | |
| 2012/0236403 A1 | 9/2012 | Sykora et al. | |
| 2013/0063968 A1 * | 3/2013 | Neugebauer | G02B 6/0043 362/603 |
| 2013/0076710 A1 | 3/2013 | Schultz et al. | |
| 2013/0094084 A1 | 4/2013 | Merrill et al. | |
| 2013/0170218 A1 | 7/2013 | Wolk et al. | |
| 2013/0299452 A1 | 11/2013 | Myers et al. | |
| 2015/0277023 A1 | 10/2015 | Etienne et al. | |

FOREIGN PATENT DOCUMENTS

| | | |
|---|---|---|
| CN | 201117515 Y | 9/2008 |
| CN | 101476698 A | 7/2009 |
| CN | 201698940 U | 1/2011 |
| CN | 102289026 A | 12/2011 |
| CN | 202196196 U | 4/2012 |
| CN | 102103410 B | 8/2012 |
| CN | 202361208 U | 8/2012 |
| CN | 202394186 U | 8/2012 |
| CN | 202452281 U | 9/2012 |
| CN | 202581138 U | 12/2012 |
| CN | 103411177 A | 11/2013 |
| EP | 1555477 B1 | 11/2007 |
| JP | 7281030 A | 10/1995 |
| JP | 9197196 A | 7/1997 |
| JP | 2000098360 A | 4/2000 |
| JP | 2000171813 A | 6/2000 |
| JP | 2001052519 A | 2/2001 |
| JP | 2001228477 A | 8/2001 |
| JP | 2002250917 A | 9/2002 |

* cited by examiner

LIGHT DIFFUSING COMPONENT AND A METHOD OF MANUFACTURING A LIGHT DIFFUSING COMPONENT

CROSS-REFERENCE TO RELATED APPLICATIONS

This application claims the benefit of priority under 35 U.S.C. § 371 of International Patent Application Serial No. PCT/US15/56560, filed on Oct. 21, 2015, which in turn, claims the benefit of priority of U.S. Provisional Patent Application Ser. No. 62/067657 filed on Oct. 23, 2014, the contents of each of which are relied upon and incorporated herein by reference in their entireties.

BACKGROUND

The present disclosure relates generally to a method of manufacturing a light diffusing component, and, more particularly, to a method of manufacturing a light guide for use in a transparent or translucent display.

A typical transmissive display may include a liquid crystal stack illuminated by a uniform backlight. The backlight, in a transmissive display, is a collection made of the light guide with embedded scattering centers, light management films such as an IDF (image directing film) and a D-BEF (brightness enhancing film), followed by a diffuser. The combined performances of these light management films help deliver a backlight assembly with uniform brightness all across its dimensions. Because the backlight is hidden behind a number of components, including cross polarizers, the architecture of transmissive backlights is more forgiving.

The main structure of any LCD (liquid crystal display) system is the light guide that illuminates the many LCD cells. The most common and current implementation uses side-located LED light sources injecting light into the light guide. The light guide is itself embedded with scattering centers at the bottom surface. These scattering centers whether concave or convex are responsible for scattering and redirecting the light propagating through the light guide. If the scattering centers or dots are placed periodically along the light guide, the light extraction pattern follows an exponential decay, where most of the power is extracted at the beginning and gradually falls off as less and less power remains available in the light guide. To maintain uniform brightness across the whole light guide, the scattering center distribution must be such that less extraction scattering centers are available where the power is high (near the LEDs) and more extraction scattering centers are made available where the power is low. In such an implementation, the size of the scattering centers often remains constant and well-defined (typically hundreds of microns to a millimeter in size), while the distance between scattering centers decreases from around 300-μm near the LEDs to around 30-μm at the opposite end of a one-dimensional gradient.

A recent trend in displays is toward transparent and translucent displays. Potential uses for transparent or translucent displays include hospital walls, building windows, digital signage, window advertisement, and heads-up displays. Transparent displays may stimulate the concept of display on demand, where the display will only be there when you want it.

Different from a transmissive display, in a transparent or translucent display, the only components that may be present are the translucent LCD stack and the light guide. In a transparent or translucent display, there are no more diffusers, light management films, or back reflector. Such displays may require light scattering centers that are extremely small, so as to be invisible. The light scattering centers may also need to be randomized to minimize any interference (Moire) with the LCD stack.

Similar to a transmissive display, in order to compensate for the natural exponential decay observed as light propagates through the light-guide, a gradient may be needed in the scattering center distribution of a transparent or translucent display to allow uniform light extraction.

The present disclosure provides a method of manufacturing a light diffusing component, or light guide, for use in a transparent or translucent display.

BRIEF SUMMARY

One embodiment of the present disclosure provides a method of producing a light diffusing component, or light guide, by a mask and etch process. The method includes creating a pattern of scattering centers on at least a portion of a frontside of a substrate, which may be a glass sheet, resulting in a light guide for use in a display. The light guide may further comprise an edge. The edge may be configured to receive a light source. The pattern of scattering centers has a lesser density of scattering centers adjacent the edge and a greater density of scattering centers as the distance from the edge increases. The scattering centers may be created by depositing a masking material on the frontside to create a mask on the frontside, adhering the mask to the frontside, and etching the frontside. The frontside may then be cleaned.

In one embodiment of the present disclosure, the density of scattering centers is controlled by controlling the density of the mask on the frontside. The desired density of scattering centers may be achieved by depositing a greater amount of masking material adjacent the edge and reducing the amount of the masking material as the distance from the edge increases.

In another embodiment of the present disclosure the density of scattering centers is controlled by curing the masking material in a manner to permit lessened etching adjacent the edge and permit increased etching as the distance from the edge increases.

Another embodiment of the present disclosure provides a glass light diffusing component comprising a glass sheet with an edge configured to receive a light source and a scattering layer having a plurality of light scattering centers etched with the scattering centers having an increased density as the distance from the edge increases, the scattering centers being randomly distributed in size.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
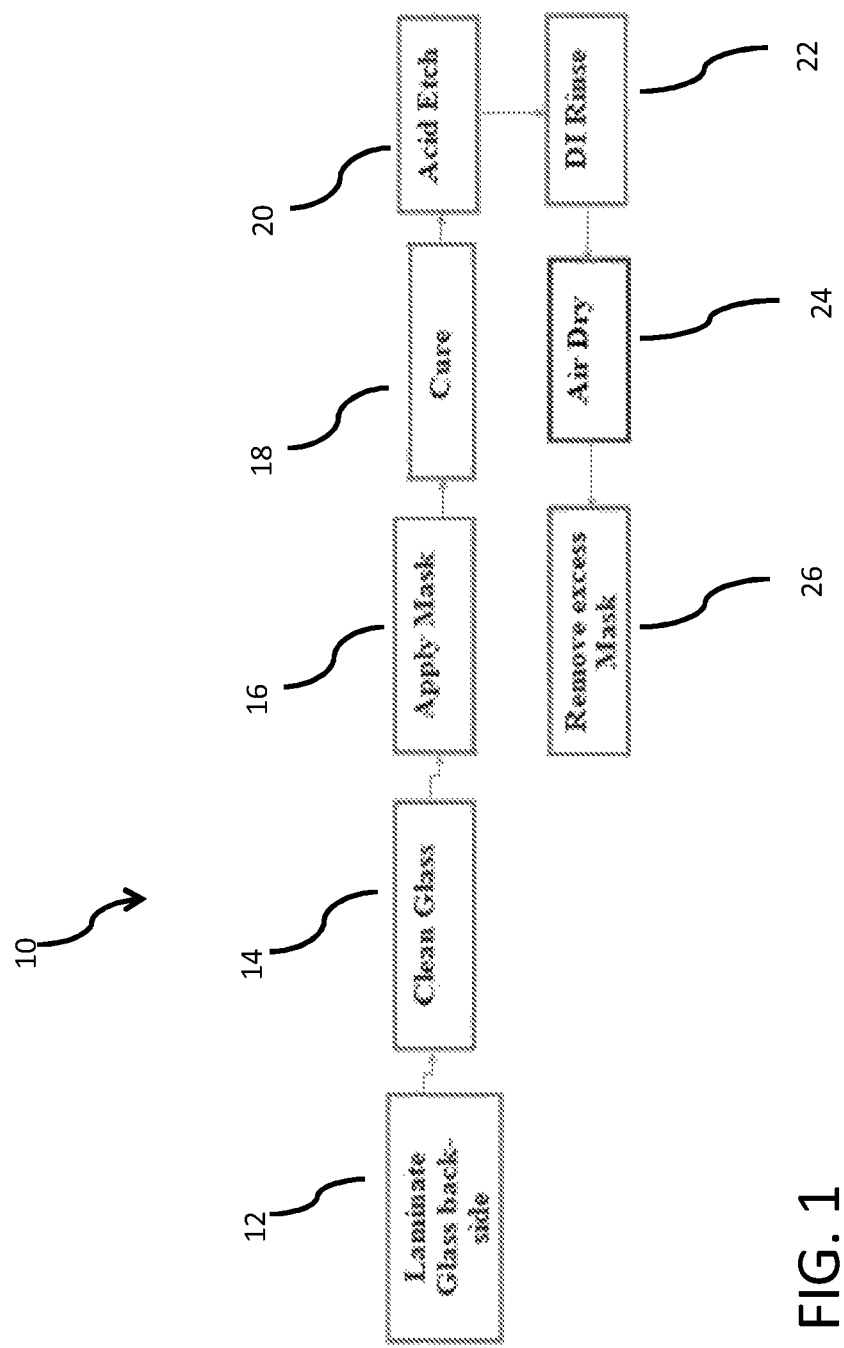
FIG. 1 is a diagram setting out the steps of one embodiment of the present disclosure.

Reference will now be made in detail to embodiments of the present technology, examples of which are illustrated in the accompanying drawings. Whenever possible, the same reference numerals will be used throughout the drawings to refer to the same or like parts.

The present disclosure provides a mask and etch process for making a light guide for use in a transparent or translucent display. In some embodiments, the present disclosure generates a randomized micro-dot array structure that satisfies the requirement of size, randomness, and profile distribution for a light guide in a transparent or translucent display. The light guide described herein may be made of a conventional substrate used in displays, such as plastic or glass.

The general structure of the substrate used in the light guide is as a sheet having two major planar surfaces roughly parallel to each other, described herein as the frontside and backside, and at least one edge roughly orthogonal to and connecting the two major planar surfaces. In some embodiments, the substrate is rectangular in shape with four edges. The edge may be flat (or planar), or may have bevels or other configurations that connect it to the frontside and backside.

FIG. 1 is a diagram setting out the steps of one embodiment of the present disclosure. In some embodiments of the present disclosure, the first step may be the step of laminating the glass backside, box 12. The glass backside is laminated to protect the backside from the process that will provide the glass frontside with the desired scattering center pattern. Any conventional laminate used in an etching process to protect surfaces and that will not be etched may be used. The terms backside and frontside do not designate a particular orientation of the light guide in a final product and are used only to differentiate the discussion of one side from the discussion of the other side.

The next step may be to clean the glass frontside, box 14. In some embodiments of the present disclosure, the cleaning step may include wiping the glass frontside thoroughly with acetone, then wiping thoroughly with isopropyl alcohol, then inserting the glass in UV ozone for 15 minutes with 30 psi oxygen flow, followed by a 5 minute cool down cycle.

The next step requires the mask to be applied, box 16. The mask may be made of any conventional masking material, such as, for example, organic or inorganic polymers, photoresists, metals (Ag, Au, Cu, Cr), oxides (silicon dioxide) or nitrides (silicon nitride) that are resistant to the etchant.

As explained above, to maintain uniform brightness across the entire light guide, the scattering center distribution must be such that less scattering centers are located where the power is high (near the LEDs) and more scattering centers are made available where the power is low. Light intensity in the light guide typically falls off in a nonlinear fashion. In order to correctly address the change in intensity, the mask is designed to allow less etching of the frontside nearest the LED(s) and gradually allow more etching as a function of distance from the LED edge. As distance from the light source or sources increases, the protection against etching decreases so that more etching will take place and more scattering centers will be created in the etching step, described below. The scattering center distribution may be nonlinear or linear, but is such that it accounts for and corrects for the light intensity changes in the light guide and provides for approximately equal intensity (±20% or less, ±15% or less, ±10% or less, or ±5% or less) out of the frontplane of the light guide.

In some embodiments of the present disclosure, the mask may be deposited on the glass frontside to create a negative of the desired scattering center profile distribution. As noted above, when the LEDs are positioned at only one edge (or side) of the light guide, the glass frontside of the light guide adjacent the LED will receive greater protection while the glass frontside of the light guide removed from the LED will receive lesser protection. However, in cases where LEDs will be positioned on opposite edges of the light guide, the center area of the glass frontside will receive lesser protection against etching.

In a non-limiting embodiment of the present disclosure, the mask may be applied by an inkjet printer and the mask may be an ink. The inkjet printer may apply a pattern as directed by a simple bitmap file. In a first embodiment, the mask pattern may be made to be a continuous ink gradient with ink density gradually decreasing away from the edges. Where LEDs will be positioned on opposite sides of the light guide, the ink density varies from thick to thin and then gradually increases back to thick. As noted above, where the masking material alone dictates the etching pattern, it is important to print the negative of the final result needed. After etching, the scattering centers will be scarce near the edges and more frequent towards the center where the ink density was decreased. The glass frontside will be etched to a greater extent where the ink density is decreased.

In a non-limiting embodiment of the present disclosure, the mask may be applied by an inkjet printer and the mask may be ink in two layers. A first light mask pattern may be made to be continuous without a gradient. A second pattern made of randomly positioned ink droplets may be deposited onto the first mask as a gradient. In this particular two-layer mask, because the acid penetrates faster where the extra droplets are absent, the final structure will be random in shape and size, but not in position.

In a third embodiment, the mask can be made of a dense ink material with distributed interstitial openings. These openings can be dots or of other arbitrary shapes. The size of the openings can be kept either constant or varied. The locations of the openings can be made random or not, depending on the intended use of the light guide. This particular embodiment allows the designer to meet specific targets of feature shape, size and location. Since a clear pathway is provided to the acid, the etched substrate will have features that are only random if the mask is random.

Inkjet application of ink as the mask may be beneficial because inkjet printing technology is readily developed, scalable and mature. An inkjet printer can easily control size distribution and lateral spacing of the ink deposited and thus the resulting scattering centers. While macroscopically an ink droplet deposited by an inkjet printer looks uniform, it is made of many smaller dye particles randomly distributed in the dot, which may provide the final product with a random pattern of scattering centers having the desired dimension that is invisible to the naked eye—i.e., smaller than about 20 μm.

The patterning created by an inkjet printer can be controlled in many different ways such as by ink coverage, number of passes, ink density, ink thickness, ink color, the curing temperature, the nozzle height and the nozzle speed.

An inkjet printer can make the mask continuous or discrete with interstitial dots, depending on requirements.

The next step requires the curing of the masking material, box 18. The type of curing will be dictated by the type of masking material used. For example, ultraviolet curing is well known in the industry of mask and etch processes and may be used for UV sensitive masking materials. In the case of ink deposited by an inkjet printer, UV curing may be utilized.

The curing step may be regulated so that the masking material may be cured different amounts depending on the distance to the light guide edge where the LED will be placed. The curing of the masking material may be implemented to permit increased protection against etching adjacent the edge and permit decreased protection against etching as the distance from the edge increases is controlled by varying the temperature of the curing. In other words, curing can be implemented that will provided decreased etching adjacent the edge and increased etching as the distance from the edge increases. In such an embodiment, the masking material may be evenly distributed on the portion of the frontside to be subjected to etching and the amount of etching achieved may be a function of the amount of curing of the masking material.

The next step requires the etching of the glass frontside, box 20. The etching step will etch the glass frontside as a function of the protection provided to that surface by the masking material. As explained above, greater etching will take place where there is less masking protection and less etching will take place where there is greater masking protection. Also as explained above, the masking protection may be derived from the way the masking material is deposited or the way the masking material is cured.

In some embodiments of the present disclosure, the etching may be done using a wet chemical etch. Wet chemical etching processes are well known in the art—for example, the etch may be composed of a mixture of glacial acetic acid (GAA) and a ammonium fluoride ($NH_4F$). The ammonium fluoride may be a 40% aqueous mixture of ammonium fluoride ($NH_4F$). The proportion of GAA to $NH_4F$ may be from about 9:1 to about 1:9, by volume. This etching composition is relatively mild and will not corrode or damage equipment used in the process of the present disclosure.

The next step may be removal of the etchant—for example, via use of a deionized water rinse, box 22, followed by the step of air drying, box 24.

The next step, optionally involves removing any remaining excess masking material, shown in box 26, by any conventional method appropriate for the type of masking material used.

Finally, once the etching process is complete, the backside laminate may be removed.

One factor defining the transparency of a light guide is the "haze" of the light guide. In the art, transmission haze is defined as the percent of transmitted light that is scattered more than 2.5° from the direction of the incident beam. Haze is an indication of the roughness of an etched surface. Greater roughness increases haze; lesser roughness reduces haze. In some nonlimiting embodiments, for a transparent display, the light guide may have haze of no more than about 15%; or no more than about 14%; or no more than about 10%. Haze (and roughness) may be controlled by the concentration of the acid in the acid etch as well as time of etch. A higher concentration and increased etching time increases haze (and roughness).

Figure 2:
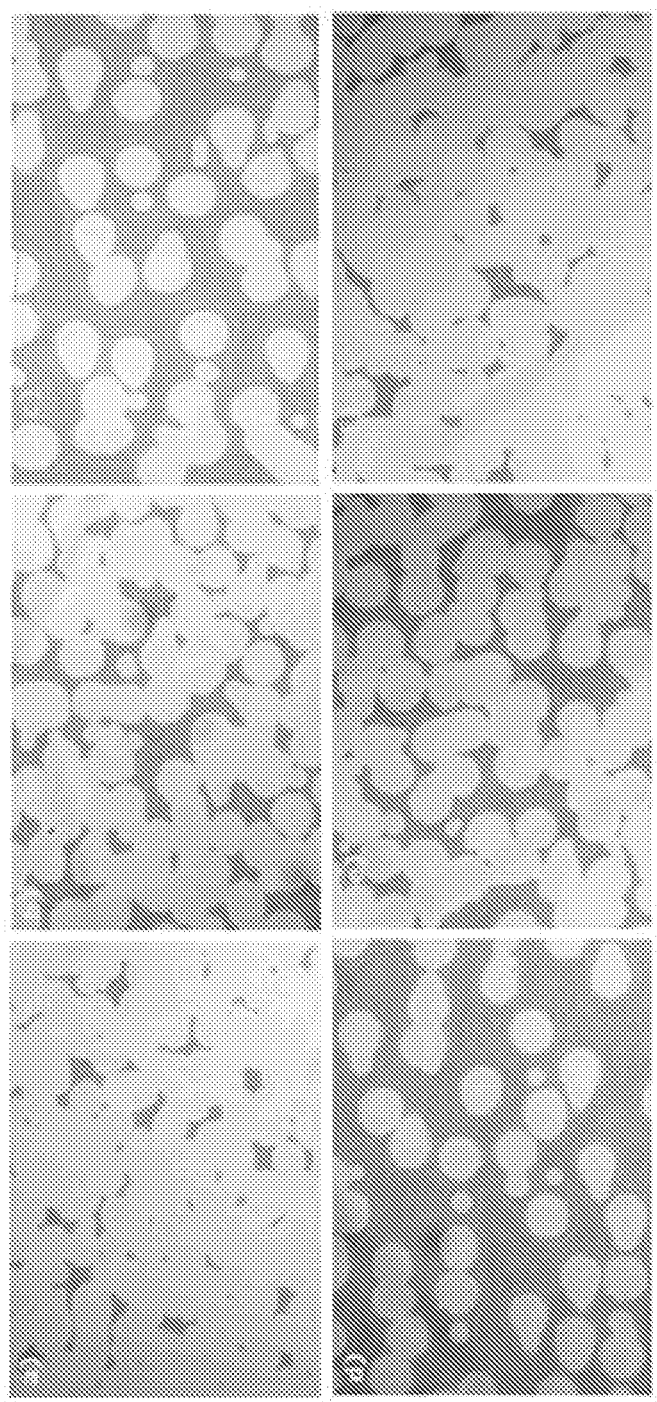
FIG. 2 shows a glass sheet with scattering centers etched into the surface.

A sample light guide was prepared according the present disclosure using a 30-5-30M (magenta) ink density gradient. The sample light guide was etched with a 9:1 solution of GAA:40% aqueous mixture of $NH_4F$. The resulting scattering centers were random as shown in FIG. 2. The scattering centers are randomly distributed in size and smaller than about 200 µm and are not optically visible with the naked eye. As can be seen in FIG. 2, the density distribution of features varies from low-to-high-to-low as a function of the distance from the light source. In this geometry, the light guide is designed to be illuminated from two sides.

The sample light guide of the present disclosure was compared to a commercial tablet light guide and a uniformly etched light guide with no gradient. The commercial tablet light guide includes scattering centers that were constant and well-defined, while the distance between scattering centers decreased from around 300-µm near the LEDs to around 30-µm at the opposite end of a one-dimensional gradient. Regarding the uniformly etched light guide with no gradient, its scattering centers were about 200 µm in diameter and distance between scattering centers varied randomly from 10 µm to 300 µm.

Figure 3:
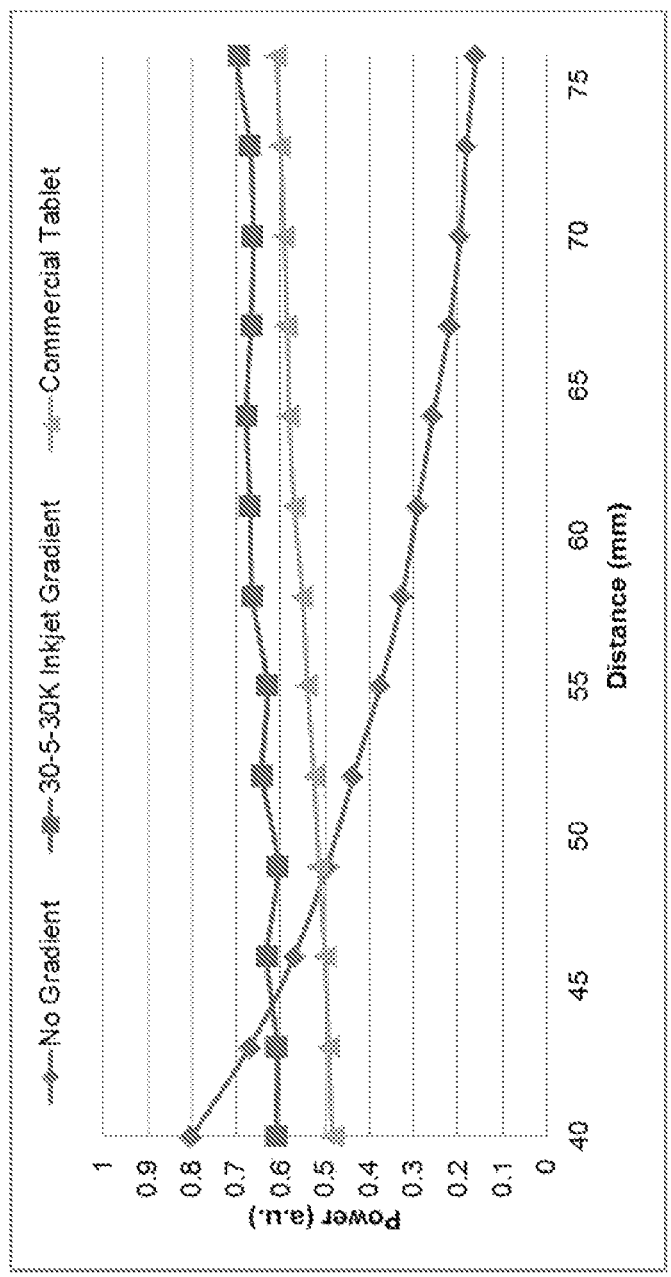
FIG. 3 is a chart showing the effectiveness of a light guide of the present disclosure as compared to a commercial light guide and a light guide with a uniform density of scattering centers.

All three samples were illuminated from the bottom as a detector scanned the surfaces in a vertical manner. FIG. 3 summarizes detected power as captured by the detector. As shown in FIG. 3, the uniformly etched sample (diamond data points) shows a gradual decay of the power as a function of distance into the sample. The commercial backlight (triangle data points) shows a very uniform but non-decaying output. This type of output is preferred for LCD backlight applications. The backlight of the present disclosure (square datapoints) shows even better light extraction capability than the commercial tablet.

It will be apparent to those skilled in the art that various modifications and variations can be made without departing from the spirit and scope of the aspects described herein, which is defined by the appended claims.

The invention claimed is:

1. A method of producing a light diffusing component comprising:
   creating a pattern of scattering centers on at least a portion of a first surface of a substrate; the substrate further comprising an edge, the edge configured to receive a light source; the pattern having a lesser density of scattering centers adjacent the edge and a greater density of scattering centers as the distance from the edge increases, the creating step comprising:
   depositing a masking material on the first surface to create a mask on the first surface;
   adhering the mask to the first surface; and
   etching the first surface;
   wherein the masking material is ink and wherein the depositing step comprises depositing a first layer of ink having a uniform density and depositing a second layer of ink having a greater density of ink adjacent the edge and reducing the density of the ink as the distance from the edge increases.

2. The method of producing a light diffusing component of claim 1 wherein the substrate is a glass sheet.

3. The method of producing a light diffusing component of claim 1 wherein during the depositing step, ink is deposited through an ink nozzle and the density of the second layer of ink deposited during the depositing step is controlled by varying ink thickness, varying ink color, varying the ink nozzle height, or varying the ink nozzle speed.

4. The method of producing a light diffusing component of claim 1 wherein the adhering step comprises the step of curing the masking material in a manner to permit lessened etching adjacent the edge and permit increased etching as the distance from the edge increases.

5. The method of producing a light diffusing component of claim 4 wherein the curing is controlled by varying the temperature of the curing.

6. The method of producing a light diffusing component of claim 1 wherein the etching step comprises etching the first surface to create a gradient of density of scattering centers with a decreased density of scattering centers adjacent the edge and an increased density of scattering centers as the distance from the edge increases.

7. The method of producing a light diffusing component of claim 1 wherein the etching step is performed in an etch bath that comprises a mixture of glacial acetic acid (GAA) and ammonium fluoride (NH4F).

8. The method of producing a light diffusing component of claim 1 wherein the glass sheet further comprises a second surface, the second surface is spaced apart from the first surface, and further comprising laminating the second surface prior to the creating step, and cleaning the second surface after the creating step.

9. The method of producing a light diffusing component of claim 1 further comprising cleaning the first surface after the creating step.

10. The method of producing a light diffusing component of claim 1 further comprising cleaning the first surface after the creating step.

11. A method of producing a light diffusing component comprising:
    creating a pattern of scattering centers on at least a portion of a first surface of a substrate; the substrate further comprising an edge, the edge configured to receive a light source; the pattern having a lesser density of scattering centers adjacent the edge and a greater density of scattering centers as the distance from the edge increases, the creating step comprising:
        depositing a masking material on the first surface to create a mask on the first surface;
        adhering the mask to the first surface; and
        etching the first surface;
    wherein the adhering step comprises curing the masking material to permit lessened etching adjacent the edge and permit increased etching as the distance from the edge increases and the curing is controlled by varying the temperature of the curing.

12. The method of producing a light diffusing component of claim 11 wherein the substrate is a glass sheet.

13. The method of producing a light diffusing component of claim 11 wherein the depositing step comprises depositing a greater density of masking material adjacent the edge and reducing the density of the masking material as the distance from the edge increases.

14. The method of producing a light diffusing component of claim 11 wherein the masking material is ink.

15. The method of producing a light diffusing component of claim 14 wherein the ink is deposited with an inkjet printer, the inkjet printer depositing ink droplets comprising small dye particles randomly distributed in size.

16. The method of producing a light diffusing component of claim 14 wherein during the depositing step, ink is deposited through an ink nozzle and the density of the ink deposited during the depositing step is controlled by varying ink thickness, varying ink color, varying the ink nozzle height, or varying the ink nozzle speed.

17. The method of producing a light diffusing component of claim 11 wherein the etching step comprises etching the first surface to create a gradient of density of scattering centers with a decreased density of scattering centers adjacent the edge and an increased density of scattering centers as the distance from the edge increases.

18. The method of producing a light diffusing component of claim 11 wherein the etching step is performed in an etch bath that comprises a mixture of glacial acetic acid (GAA) and ammonium fluoride (NH4F).

* * * * *